(12) United States Patent
Takami

(10) Patent No.: US 8,913,082 B2
(45) Date of Patent: Dec. 16, 2014

(54) INFORMATION DISPLAY DEVICE, INFORMATION DISPLAY METHOD, INFORMATION DISPLAY PROGRAM, RECORDING MEDIUM AND INFORMATION DISPLAY SYSTEM

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 76 days.

(21) Appl. No.: 13/391,796

(22) PCT Filed: Sep. 27, 2010

(86) PCT No.: PCT/JP2010/066665
§ 371 (c)(1),
(2), (4) Date: Feb. 22, 2012

(87) PCT Pub. No.: WO2011/040358
PCT Pub. Date: Apr. 7, 2011

(65) Prior Publication Data
US 2012/0147037 A1  Jun. 14, 2012

(30) Foreign Application Priority Data

Sep. 30, 2009 (JP) .................................. 2009-226500
May 28, 2010 (JP) .................................. 2010-123559

(51) Int. Cl.
G09G 5/14 (2006.01)
G06T 11/60 (2006.01)
G06T 11/00 (2006.01)
G06T 19/00 (2011.01)
G06F 17/30 (2006.01)

(52) U.S. Cl.
CPC ...... *G06F 17/30991* (2013.01); *G09G 2310/04* (2013.01); *G09G 5/14* (2013.01)
USPC ........................... 345/629; 345/619; 715/788

(58) Field of Classification Search
CPC ................ G09G 5/14; G09G 2340/10; G09G 2340/125; G09G 5/346; G06T 11/60; G06T 19/00; G06T 11/00; G06F 3/0485
See application file for complete search history.

(56) References Cited

U.S. PATENT DOCUMENTS 5,412,776 A * 5/1995 Bloomfield et al. .......... 715/783
2006/0152898 A1   7/2006 Hirayama
(Continued)

FOREIGN PATENT DOCUMENTS

JP   6-266523 A    9/1994
JP   8-272576 A   10/1996
(Continued)

OTHER PUBLICATIONS

European Search Report dated Dec. 5, 2012 for EP 10820473.6.
(Continued)

*Primary Examiner* — Ulka Chauhan
*Assistant Examiner* — Saptarshi Mazumder
(74) *Attorney, Agent, or Firm* — Sughrue Mion, PLLC

(57) ABSTRACT

An information display device switches content to be displayed without causing an eyesore to users. The information display device has a display means that displays information including a content display area which displays content, in a display area in a screen, a deciding means that decides whether or not the content display area hides, and a switching means that switches content displayed in the content display area when it is decided that the content display area hides.

21 Claims, 11 Drawing Sheets

(56) References Cited

U.S. PATENT DOCUMENTS

| | | |
|---|---|---|
| 2007/0192468 A1 | 8/2007 | Keeler |
| 2007/0192733 A1* | 8/2007 | Horiuchi ........................ 715/788 |
| 2008/0059571 A1* | 3/2008 | Khoo ............................. 709/203 |
| 2009/0076919 A1 | 3/2009 | Shuster |
| 2009/0083655 A1* | 3/2009 | Beharie et al. ................. 715/781 |

FOREIGN PATENT DOCUMENTS

| | | |
|---|---|---|
| JP | 2001-56728 A | 2/2001 |
| JP | 2001-67165 A | 3/2001 |
| JP | 2002-23843 A | 1/2002 |
| JP | 2006011358 A | 1/2006 |
| JP | 2007-328444 A | 12/2007 |
| JP | 2008-3521 A | 1/2008 |
| JP | 2008-152308 A | 7/2008 |
| JP | 2008-282197 A | 11/2008 |
| JP | 2009-145406 A | 7/2009 |
| WO | WO 2005/026935 A1 | 3/2005 |
| WO | 2007089082 A1 | 8/2007 |
| WO | 2008099897 A1 | 8/2008 |

OTHER PUBLICATIONS

Office Action dated Jan. 24, 2012 issued in Japanese Patent Application No. 2010-123559.
Office Action issued Jul. 21, 2013 in Korean Patent Application No. 10-2012-7004465.

* cited by examiner

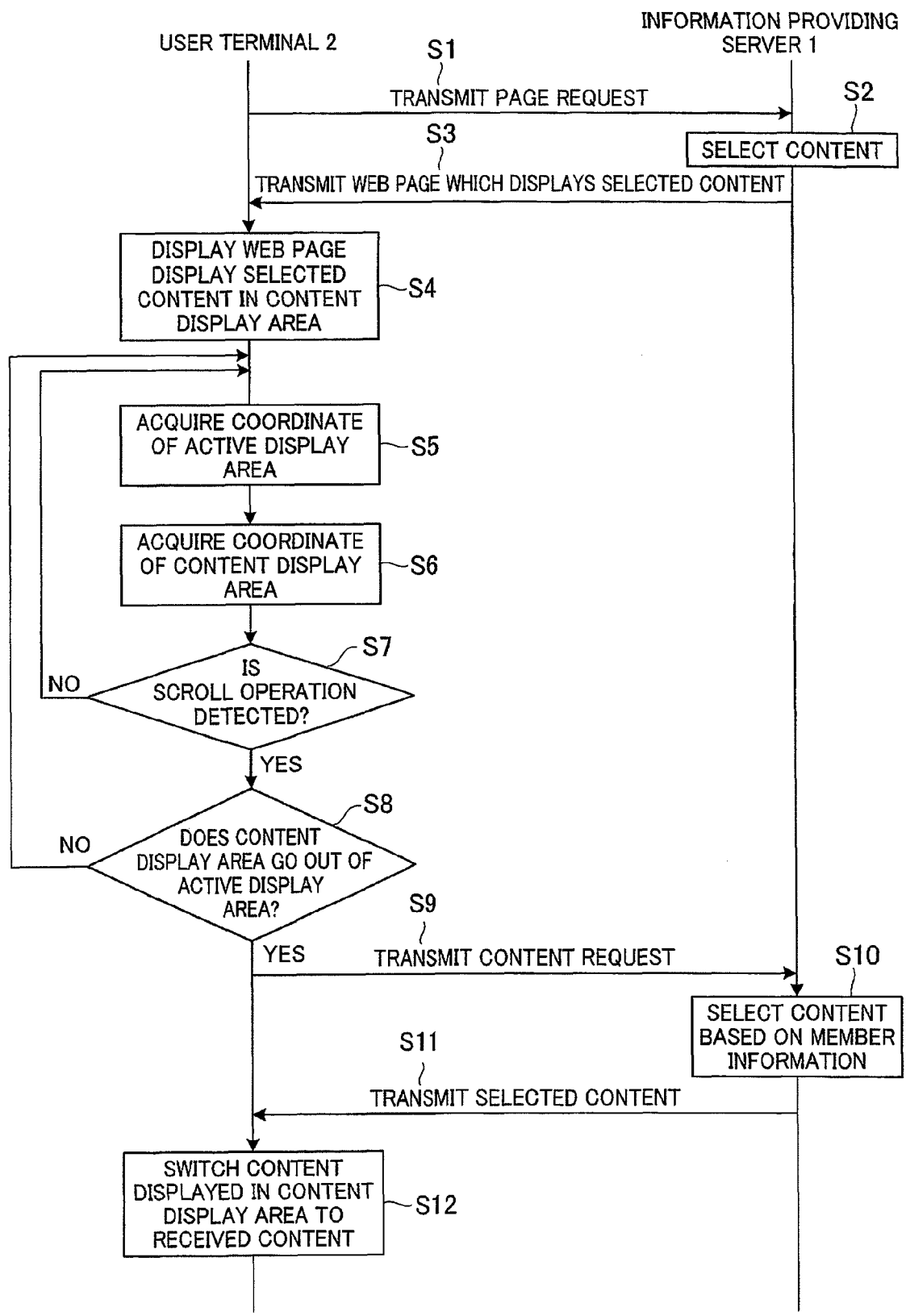

INFORMATION DISPLAY DEVICE, INFORMATION DISPLAY METHOD, INFORMATION DISPLAY PROGRAM, RECORDING MEDIUM AND INFORMATION DISPLAY SYSTEM

CROSS REFERENCE TO RELATED APPLICATIONS

This application is a National Stage of International Application No. PCT/JP2010/066665, filed on Sep. 27, 2010, which claims priority from Japanese Patent Application Nos. 2009-226500, filed on Sep. 30, 2009 and 2010-123559, filed on May 28, 2010, the contents of all of which are incorporated herein by reference in their entirety.

TECHNICAL FIELD

The present invention relates to a technical field of an information display device, an information display method, an information display program, a recording medium and an information display system which display content.

BACKGROUND ART

Conventionally, a system is known in which a server device distributes a Web page to a terminal device and makes the terminal device display content such as image data, movie data or text data in the Web page. In this system, content displayed in the Web page includes, for example, an advertisement related to a product or service, recommend information which urges users to take some actions or information which needs to be notified to the other users. When there are a plurality of pieces of information which need to be notified to the users, a plurality of contents are generally displayed in a Web page. However, if multiple pieces of information which are not always necessary for users at a current point of time are displayed at one time, these pieces of information are eyesores for users.

In relation to the above, a technique is being proposed which switches display of content instead of displaying all contents at one time and displays content at a given timing.

For example, Patent Literature 1 discloses a technique of displaying display information in a display frame of a site page. With this technique, display information displayed in the display frame switches after a certain period of time.

Further, Patent Literature 2 discloses a technique of displaying a list of a plurality of contents. With this technique, one of content lists is displayed, and a caption matching each list is displayed. Further, when a cursor points at (a mouse hovers over) the displayed caption, an attribute value of a list matching the caption at which the cursor points is displayed by a tooltip.

CITATION LIST

Patent Literature

Patent Literature 1: Japanese Patent Application Laid-Open No. 2009-145406
Patent Literature 2: Japanese Patent Application Laid-Open No. 2008-282197

SUMMARY OF INVENTION

Technical Problem

However, with the technique disclosed in Patent Literature 1, display information automatically switches while a user watches a site page, thereby causing an eyesore to the users.

Further, with the technique disclosed in Patent Literature 2, when the cursor points at a caption, an attribute value is displayed. However, although a case is different if the caption is clicked, it is not necessarily adequate to decide that the user has an intention to display an attribute value based only on that the cursor points at a caption. There are, for example, cases where the user is moving the cursor to click another portion or is moving the cursor unconsciously. Hence, an attribute value is frequently displayed irrespectively of the user's intension, thereby causing an eyesore for the user.

The present invention is made in light of the foregoing, and it is therefore an object of the present invention to provide an information display device, an information display method, an information display program, a recording medium and an information display system which can switch content to be displayed without causing an eyesore for the user.

Solution to Problem

In order to solve the above problem, the invention according to claim 1 relates to an information display method comprising:

a display step of displaying information including a content display area that displays content, in a display area in a screen;

a deciding step of deciding whether or not the content display area in the information displayed in the display area hides;

a switching step of switching content displayed in the content display area when it is decided that the content display area hides; and a redisplay step of redisplaying the content display area with content switched therein, in the display area.

According to the present invention, the content display area in information displayed in the display area is hidden due to some factors, so that, when content in the content display area is not displayed, this content is switched. Then, when a state where the content display area is hidden is cancelled, the switched content is displayed on the screen. Consequently, content switches when the content is not visible for the user, so that it is possible to prevent an eyesore for the user.

The invention according to claim 2 relates to the information display method according to claim 1, wherein in the display step, the information including the content display area that displays a plurality of contents is displayed in the display area, and in the switching step, when it is decided that the content display area hides, at least one of the plurality of contents is switched to another content.

According to the present invention, when a plurality of contents are arranged in the content display area, it is possible to switch arbitrary content among these contents.

The invention according to claim 3 relates to the information display method according to claim 2, wherein in the deciding step, whether or not the content display area partially hides is decided, and in the switching step, when it is decided that the content display area partially hides, at least one of contents positioned at a hidden portion is switched to another content.

According to the present invention, even when only the content display area partially hides, it is possible to switch content without causing an eyesore for the user.

The invention according to claim 4 relates to the information display method according to one of claims 1 to 3, wherein in the deciding step, whether or not the content display area goes out of the display area is decided, and in the switching step, when it is decided that the content display area goes out of the display area, content displayed in the content display area is switched.

According to the present invention, when information displayed in the display area is, for example, scrolled, the content display area goes out of the display area in the screen, and, when content in the content display area is not displayed on the screen, content is switched. Then, when the content display area comes in the display area in the screen as a result of scroll of, for example, information, the switched content is displayed on the screen. Consequently, content switches when the content is not visible for the user, so that it is possible to prevent an eyesore for the user.

The invention according to claim 5 relates to the information display method according to claim 4, further comprising a detecting step of detecting scroll of the information displayed in the display area, wherein, in the deciding step, the decision is made when the information is scrolled.

According to the present invention, decision is made within a period in which information displayed in the display area is scrolled, so that it is possible to reliably decide that the content display area goes out of the display area in the screen due to scroll.

The invention according to claim 6 relates to the information display method according to claim 4, further comprising a detecting step of detecting that scroll of the information displayed in the display area stops, wherein, in the deciding step, the decision is made when it is detected that the scroll of the information stops.

According to the present invention, decision is made when scroll of information displayed in the display area stops, so that it is possible to decide at an adequate timing whether or not the content display area goes out of the display area in the screen due to scroll, and reduce a processing load of the information display device.

The invention according to claim 7 relates to the information display method according to claim 4, further comprising a detecting step of detecting a change of a scroll direction of the information displayed in the display area, wherein, in the deciding step, the decision is made when the change of the scroll direction of the information is detected.

According to the present invention, decision is made when a scroll direction for information displayed in the display area changes, so that it is possible to decide at an adequate timing whether or not the content display area goes out of the display area in the screen due to scroll, and reduce a processing load of the information display device.

The invention according to claim 8 relates to the information display method according to one of claims 4 to 7, wherein in the display step, a Web page including the content display area is displayed in the display area as the information, the information display method further comprises a link selection detecting step of detecting selection of a link to a Web page included in the Web page displayed in the display area, and in the deciding step, the decision is made when the selection of the link is detected.

According to the present invention, it is possible to reliably decide that the content display area goes out of the display area in the screen due to a change of the display position of the Web page following selection of a link to the Web page displayed in the display area in the screen.

The invention according to claim 9 relates to the information display method according to one of claims 1 to 3, Wherein, in the deciding step, whether or not the display areas other than the display area that displays the information among the plurality of display areas arranged in the screen overlap the content display area is decided, and in the switching step, when it is decided that the display areas other than the display area that displays the information overlap the content display area, content displayed in the content display area is switched.

According to the present invention, when another display area overlaps the content display area in information displayed in the display area and therefore content in the content display area is not displayed on the screen, this content is switched. Then, when a state where the display area overlaps the content display area is cancelled, the switched content is displayed on the screen. Consequently, content switches when the content is not visible for the user, so that it is possible to prevent an eyesore for the user.

The invention according to claim 10 relates to the information display method according to one of claims 1 to 9, wherein, in the switching step, when it is decided that the content display area hides even a predetermined time after it is decided that the content display area hides, content displayed in the content display area is switched.

The invention according to claim 11 relates to an information display device comprising:

a display means that displays information including a content display area that displays content, in a display area in a screen;

a deciding means that decides whether or not the content display area in the information displayed in the display area hides;

a switching means that switches content displayed in the content display area when it is decided that the content display area hides; and a redisplay means that redisplays the content display area with content switched therein, in the display area.

The invention according to claim 12 relates to 12. An information display program causing a computer provided in an information display device that displays information including a content display area that displays content, in a display area in a screen, to function as:

a deciding means that decides whether or not the content display area in the information displayed in the display area hides;

a switching means that switches content displayed in the content display area when it is decided that the content display area hides; and a redisplay means that redisplays the content display area with content switched therein, in the display area.

The invention according to claim 13 relates to a recording medium having an information display program computer-readably recorded therein that causes a computer provided in an information display device that displays information including a content display area that displays content, in a display area in a screen, to function as:

a deciding means that decides whether or not the content display area in the information displayed in the display area hides;

a switching means that switches content displayed in the content display area when it is decided that the content display area hides; and a redisplay means that redisplays the content display area with content switched therein, in the display area.

The invention according to claim 14 relates to an information display system comprising:

an information display device that displays information including a content display area that displays content; and a server device that can be connected with the information display device through a network, wherein the server device comprises:

a content storage means that stores a plurality of contents displayed in the content display area;

an information transmitting means that transmits the information to the information display device;

a content request receiving means that receives a content request transmitted from the information display device;

a selecting means that, when the content request is received, selects one of contents except content that is a display target in the content display area, among the contents stored in the storage means; and a content transmitting means that transmits the selected content to the information display device, and the information display device comprises:

an information receiving means that receives the information transmitted from the server device;

a display means that displays the received information in a display area in a screen;

a deciding means that decides whether or not the content display area in the information displayed in the display area hides;

a content request transmitting means that transmits the content request to the server device when it is decided that the content display area hides;

a content receiving means that receives content transmitted from the server device;

a switching means that switches content displayed in the content display area, to the received content; and a redisplay means that redisplays the content display area with content switched therein, in the display area.

According to the present invention, the content display area in information displayed in the display area hides due to some factors, so that, when content in the content display area is not displayed, this content is switched. Then, when a state where the content display area hides is cancelled, the switched content is displayed on the screen. Consequently, content switches when the content is not visible for the user, so that it is possible to prevent an eyesore for the user.

The invention according to claim 15 relates to the information display system according to claim 14, wherein the server device further comprises a user information storage means that stores user information related to a user of the information display device, and the selecting means determines content to be selected based on the user information.

According to the present invention, content to be switched and displayed in the content display area is determined based on user information, so that it is possible to personalize content to be displayed.

The invention according to claim 16 relates to the information display system according to claim 14 or 15, wherein the server device further comprises a history information storage means that stores history information showing a history of a predetermined action of a user of the information display device, and the selecting means determines content to be selected based on the history information.

According to the present invention, content to be switched and displayed in the content display area is determined based on history information which reflects user's actions, so that it is possible to personalize content to be displayed.

Advantageous Effects of Invention

According to the present invention, the content display area in information displayed in the display area hides, so that, when content in the content display area is not displayed, this content is switched. Then, when a state where the content display area hides is cancelled, the switched content is displayed on the screen. Consequently, content switches when the content is not visible for the user, so that it is possible to prevent an eyesore for the user.

BRIEF DESCRIPTION OF DRAWINGS

FIG. 6 is a sequence diagram illustrating a processing example of the information providing system S according to one embodiment.

DESCRIPTION OF EMBODIMENTS

Hereinafter, the best embodiment of the present invention will be described with reference to the accompanying drawings. In addition, embodiments which will be described below are embodiments where the present invention is applied to an information providing system.

1. First Embodiment 1-1. Overview of Configuration and Function of Information Providing System First, the overview of the configuration and function of the information providing system S according to the present embodiment will be described using FIGS. 1 and 2.

Figure 1:
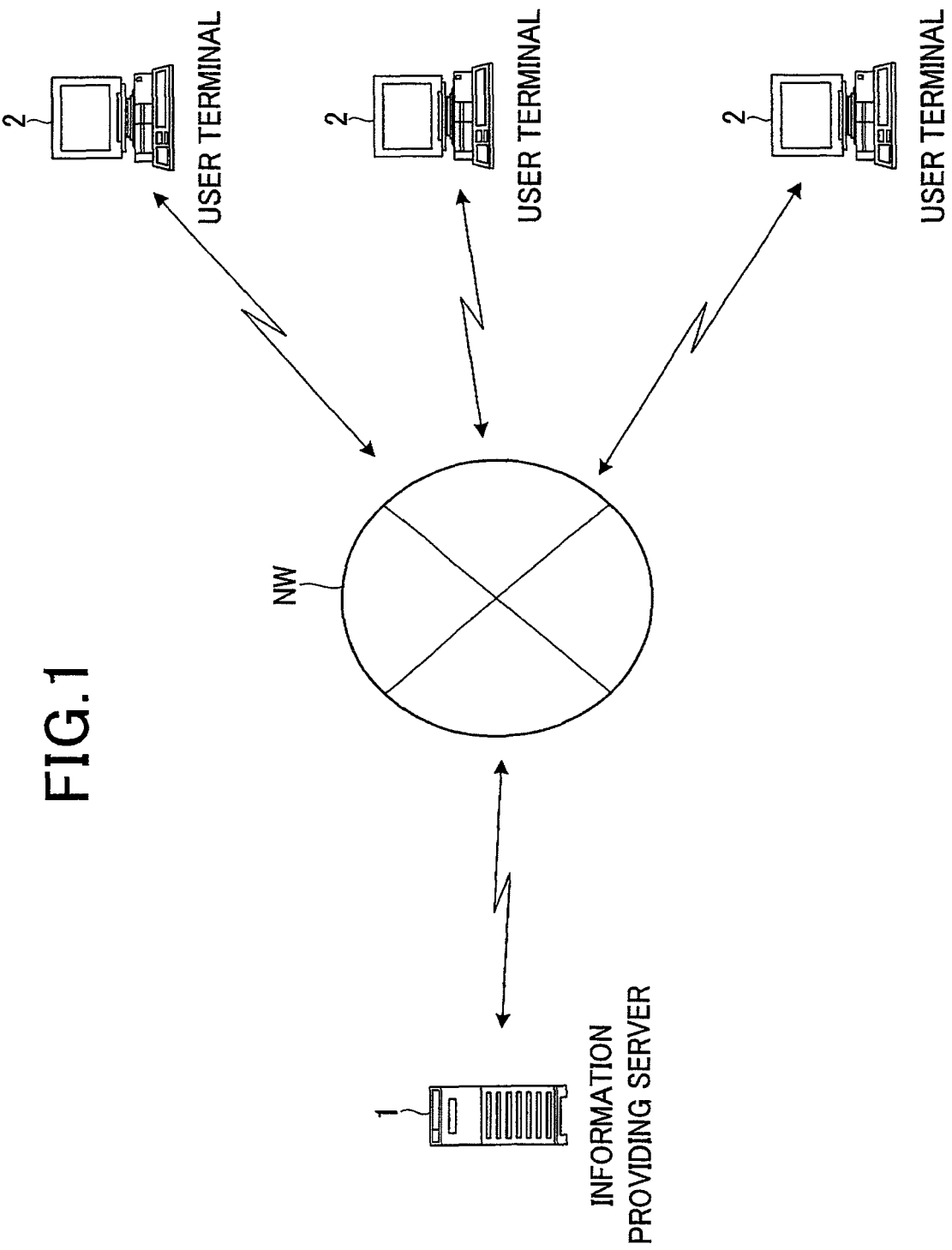
FIG. 1 is a view illustrating an example of a schematic configuration of an information providing system S according to one embodiment.

FIG. 1 is a view illustrating an example of a schematic configuration of an information providing system S according to the present embodiment.

As illustrated in FIG. 1, the information providing system S is formed including an information providing server 1 and a plurality of user terminals 2. Further, the information providing server 1 and each user terminal 2 can transmit and receive data to and from each other through a network NW by applying, for example, TCP/IP to a communication protocol. In addition, the network NW is constructed with, for example, Internet, a dedicated communication line (for example, CATV (Community Antenna Television) line), a mobile communication network (including, for example, a base station) and a gateway.

In the information providing system S employing this configuration, the information providing server 1 (an example of the server device) is a Web server which is disposed to run an information providing sites which provide, for example, various pieces of information and services. The information providing server 1 transmits a Web page to the user terminal 2 according to a HTTP (Hyper Text Transfer Protocol) request from the user terminal 2.

The user terminal 2 (an example of the information display device) displays the Web page received from the information providing server 1 on a screen.

For a predetermined Web page, a content display area is provided in a Web page. In this content display area, content is displayed. Meanwhile, the content refers to, for example, data such as image data, movie data, text data and electronic document which can be displayed. Instead, the content may be configured by mixing a plurality of types of data. Further, display content of content is, for example, an advertisement of a product or service, recommend information which recommends purchase of a product or service or another notice. The range (for example, the position and size of the content display area in the Web page) the content display area occupies in the Web page is described in HTML document which defines display content of the Web page. Further, the content which needs to be displayed in the content display area is also described in the HTML document.

With the present embodiment, the content displayed in the content display area in the Web page is switched at a timing described below.

FIG. 2 is a view illustrating a screen display example of a Web page. In FIG. 2, a reference numeral 100 denotes a Web page, a reference numeral 101 denotes an active display area of a Web browser in a screen and a reference numeral 102 denotes a content display area in which display of content is switched.

Figure 2A:
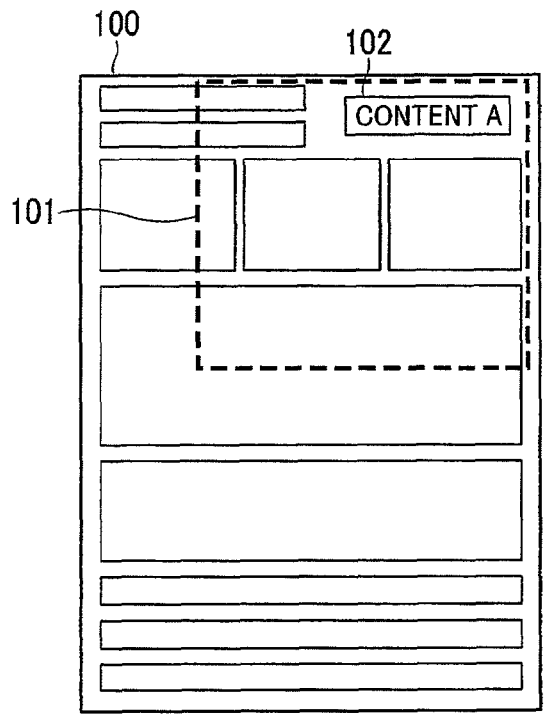
FIGS. 2A to 2D are views illustrating screen display examples of Web pages according to one embodiment.

As illustrated in FIG. 2A, a predetermined Web page 100 received by the user terminal 2 from the information providing server 1 includes the content display area 102. In this content display area 102, HTML document is described such that content A is displayed. The active display area 101 refers to, for example, a client area of a window of a Web browser when a Web page is displayed in a window, and is the entire screen when the Web page is displayed full-screen. The size of the display area 101 is limited, and therefore part of the entire Web page 100 is displayed on the screen.

When the Web page 100 is initially displayed, if the content display area 102 is in the display area 101, the content A is displayed on the screen as illustrated in FIG. 2A. Instead, when the Web page 100 is scrolled by the user's scroll operation and the content display area 102 comes in the display area 101 even though the content display area 102 is not in the display area 101 when the Web page 100 is initially displayed, the content A is displayed on the screen as illustrated in FIG. 2A. The scroll operation includes, for example, scroll operations performed by operating a scroll bar displayed on the screen using a mouse, rotating a wheel mounted on the mouse and operating a keyboard.

Figure 2B:
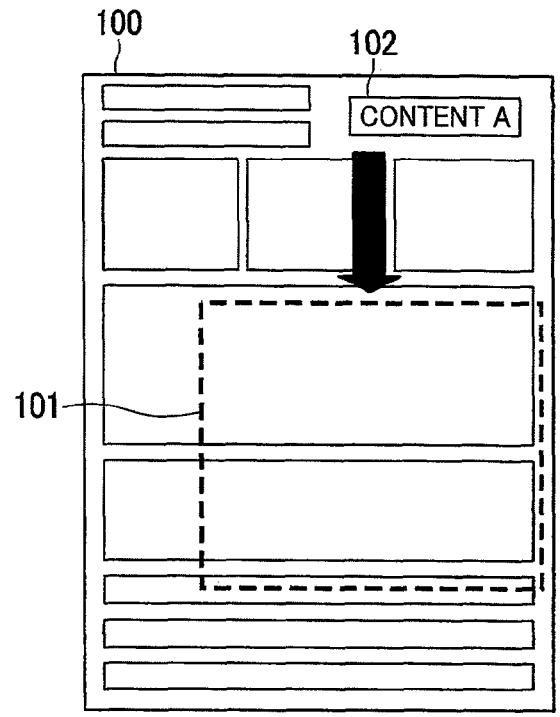
Figure 2C:
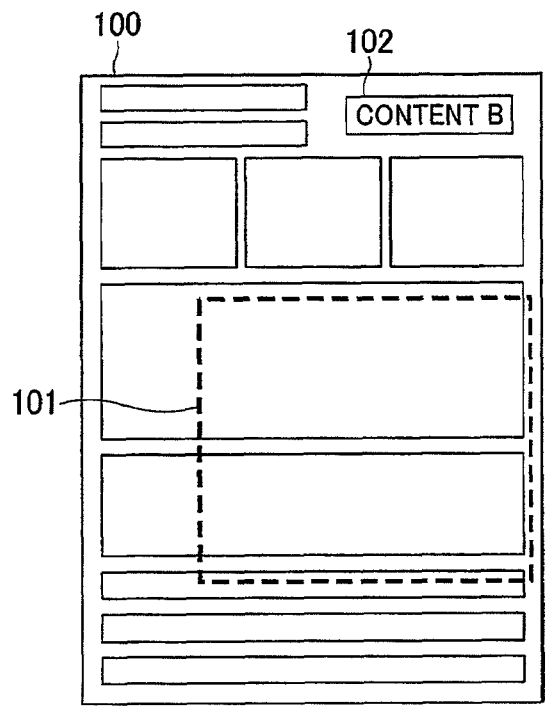

Then, as illustrated in FIG. 2B, when the Web page 100 is scrolled by the user's scroll operation, the content display area 102 goes out of the display area 101. That is, the content display area 102 hides outside the display area 101, and the content A is not displayed on the screen. Then, as illustrated in FIG. 2C, content displayed in the content display area 102 is switched from the content A to content B.

Figure 2D:
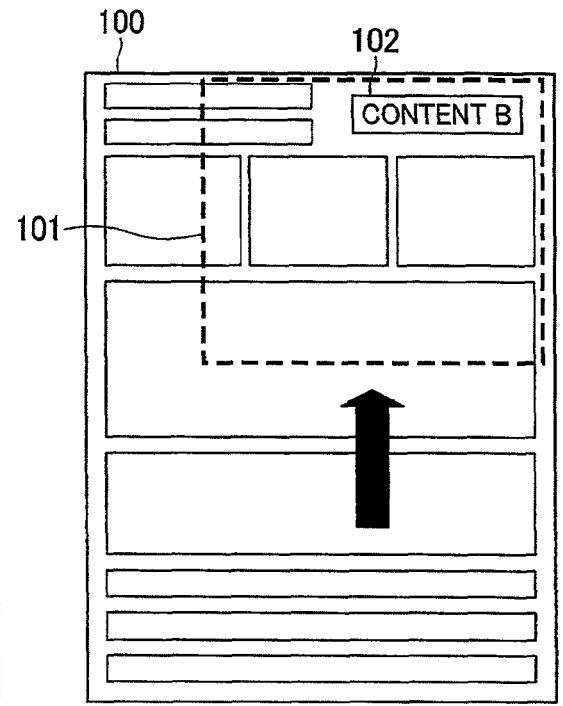

Subsequently, as illustrated in FIG. 2D, when the Web page 100 is scrolled by the user's scroll operation, and the content display area 102 comes in the display area 101, the content B is displayed on the screen.

1-2. Configuration and Function of Information Providing Server

Next, the configuration and function of the information providing server 1 will be described using FIGS. 3 and 4.

Figure 3:
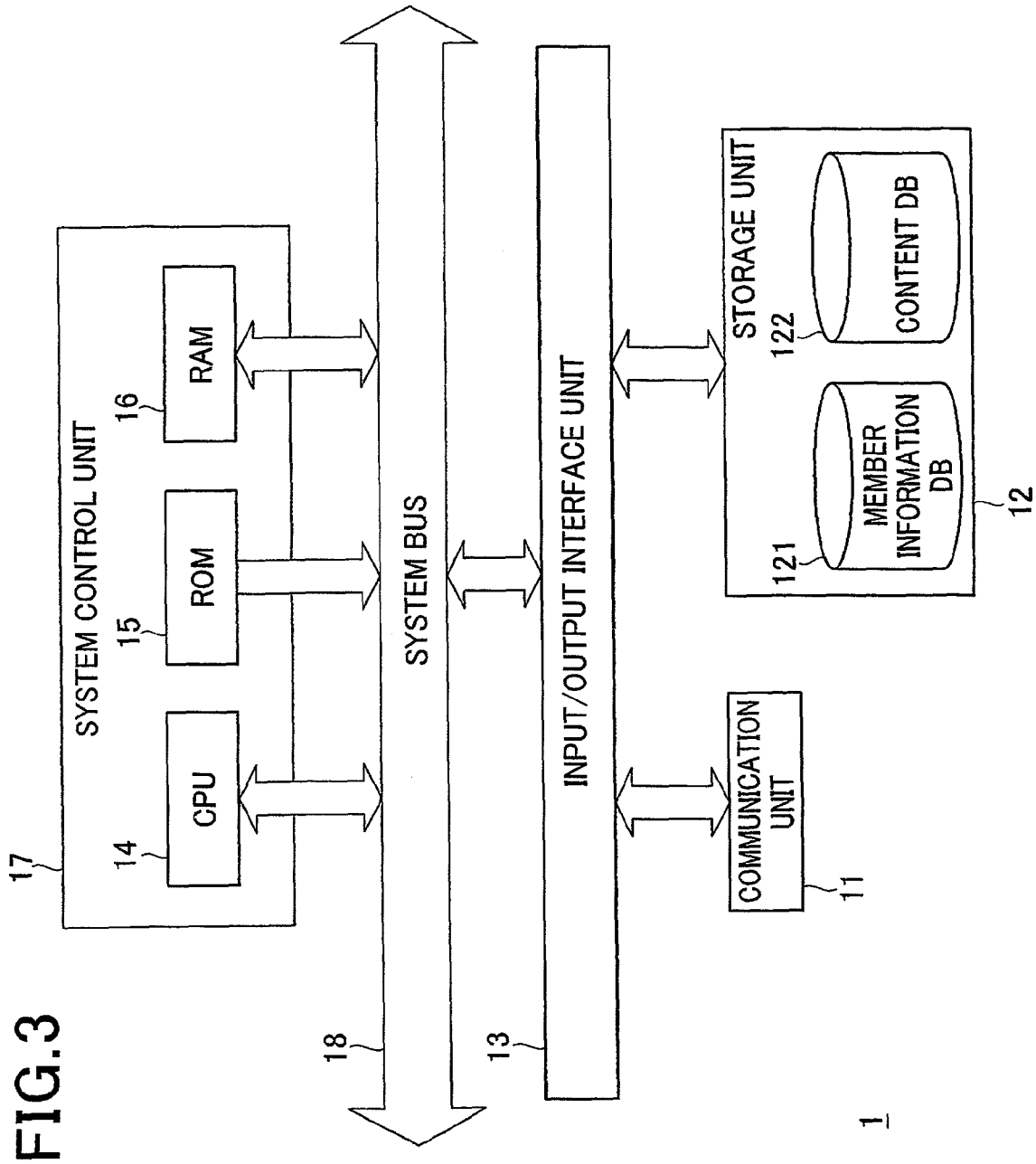
FIG. 3 is a block diagram illustrating an example of a schematic configuration of an information providing server 1 according to one embodiment.
Figure 4A:
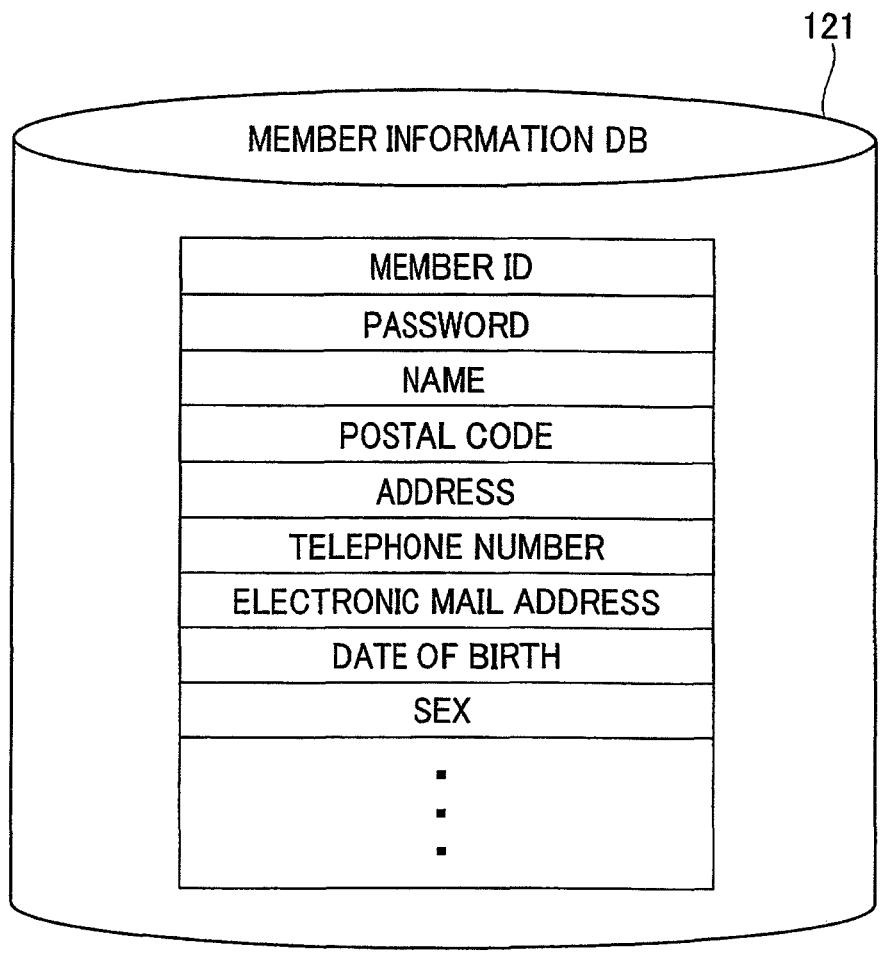
FIG. 4A is a view illustrating an example of content of information to be registered in a member information DB 121.
Figure 4B:
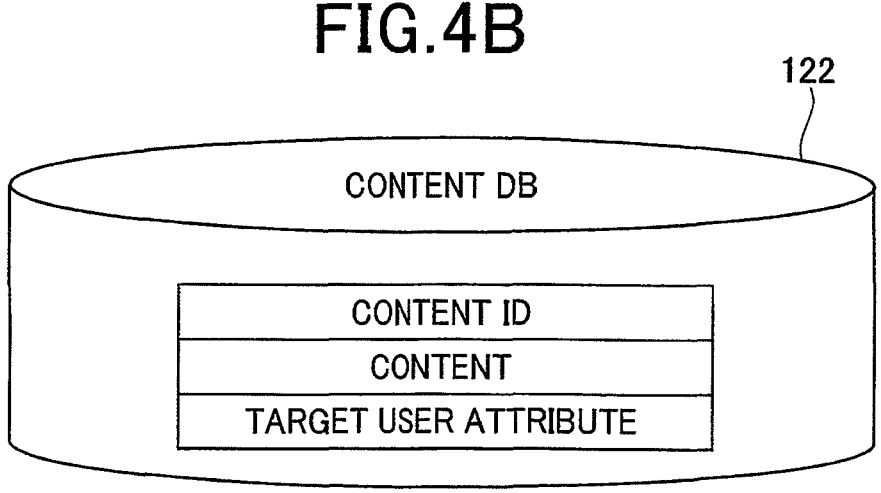
FIG. 4B is a view illustrating an example of content of information to be registered in a content DB 122.

FIG. 3 is a block diagram illustrating an example of a schematic configuration of the information providing server 1 according to the present embodiment. Further, FIG. 4A is a view illustrating an example of content of information to be registered in a member information DB 121. Furthermore, FIG. 4B is a view illustrating an example of content of information to be registered in a content DB 122.

As illustrated in FIG. 3, the information providing server 1 has a communication unit 11, a storage unit 12, an input/output interface unit 13 and a system control unit 17. Further, the system control unit 17 and input/output interface unit 13 are connected through a system bus 18.

The communication unit 11 is connected to the network NW to control a communication state with, for example, the user terminal 2. The storage unit 12 (an example of a content storage means and a user storage means) is formed with, for example, a hard disk drive, and stores programs such as an operating system, WWW server program and database management program and stores, for example, various items of data. In addition, the various programs may be acquired through the network from, for example, other server devices, or may be recorded in a recording medium and read through a drive device. The input/output interface unit 13 performs interface processing between the communication unit 11 and storage unit 12, and the system control unit 17.

In the storage unit 12, the member information DB 121 and content DB 122 are constructed.

As illustrated in FIG. 4A, in the member information DB 121, member information (an example of user information) related to users registered as members in the information providing site is registered in association with member IDs for identifying member users. More specifically, in the member information, for example, a member ID, log-in password, member name, postal code, address, telephone number, electronic mail address, date of birth and sex are set. The member information is used to, for example, personalize a Web page. With the present embodiment in particular, the member information is used to determine content which is displayed in the content display area in the Web page.

As illustrated in FIG. 4B, in the content DB 122, a plurality of contents which are displayed in the content display area in the Web page are registered in association with content IDs for identifying the contents, respectively. More specifically, a content ID, content body (for example, image data, movie data and text data) and target user attribute are registered per content. The target user attribute is information showing an attribute of the user who is the target to display content. For example, the target user attribute indicates an age, sex and residential area of the target user. In addition, when there are a plurality of Web pages including the content display area, a plurality of contents may be registered in the content DB 122 per Web page. That is, content which is a display target is changed according to a Web page to be displayed.

Further, the storage unit 12 stores a plurality of HTML documents. Part of a plurality of HTML documents are described by a tag which defines the content display area and a tag which specifies content to be displayed in the content display area (for example, specified according to a URL (Uniform Resource Locator) of content). Further, in the part of HTML documents, a content display control script (an example of an information display program) is described which controls switching of content displayed in the content display area.

The system control unit 17 is formed with, for example, a CPU (Central Processing Unit) 14, a ROM (Read Only Memory) 15 and a RAM (Random Access Memory) 16. Further, the system control unit 17 reads and executes various programs stored in the CPU 14, ROM 15 and storage unit 12 to function as an information transmitting means, a content request receiving means, a selecting means and a content transmitting means.

1-3. Configuration, Function and the Like of User Terminal

Next, the configuration, function and the like of the user terminal 2 will be described using FIG. 5.

Figure 5:
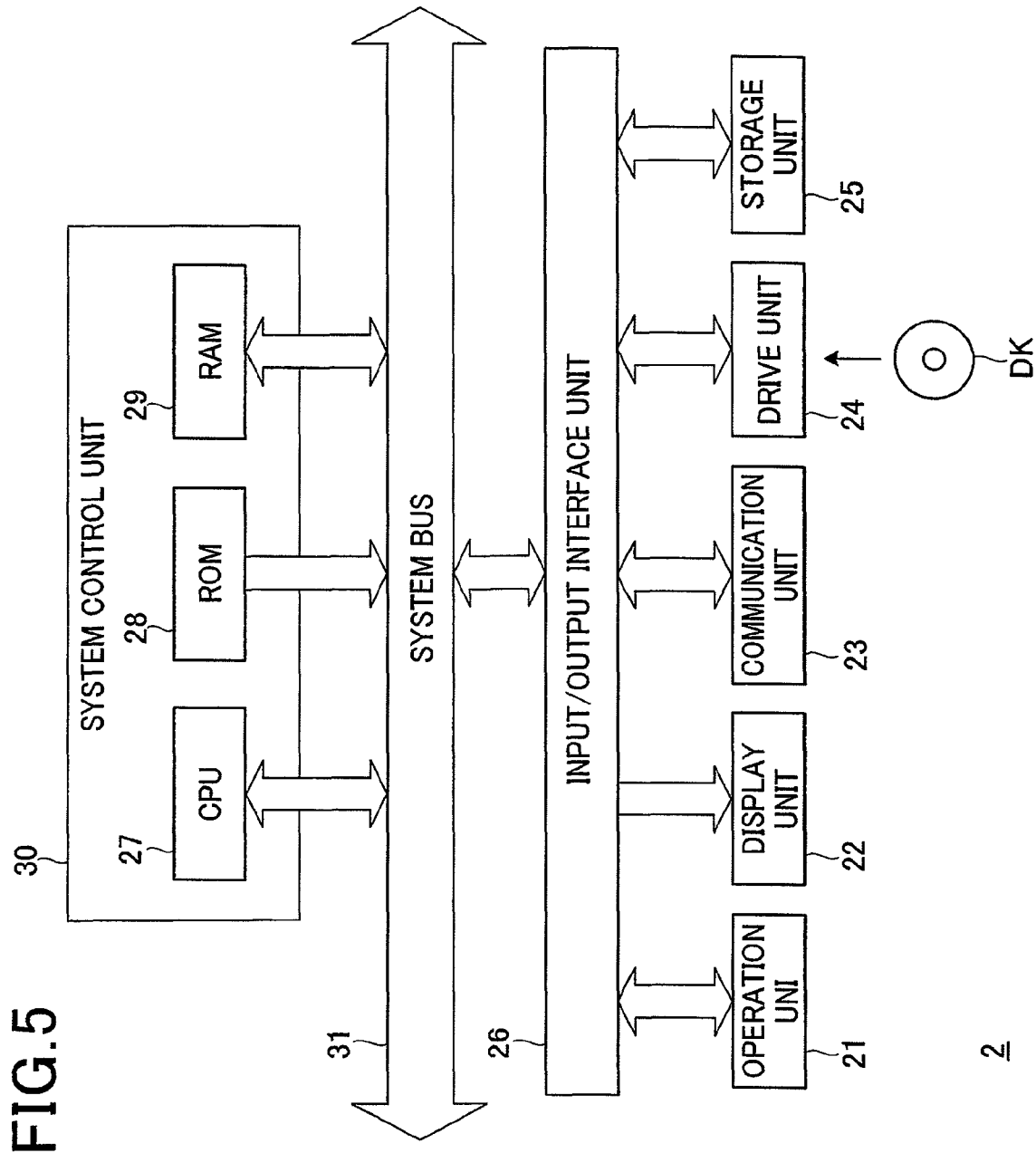
FIG. 5 is a block diagram illustrating an example of a schematic configuration of a user terminal 2 according to one embodiment.

FIG. 5 is a block diagram illustrating an example of a schematic configuration of the user terminal 2 according to the present embodiment.

As illustrated in FIG. 5, the user terminal 2 has an operation unit 21, a display unit 22, a communication unit 23, a drive unit 24, a storage unit 25, an input/output interface unit 26 and a system control unit 30. Further, the system control unit 30 and input/output interface unit 26 are connected through the system bus 31.

The operation unit 21 includes, for example, a keyboard and mouse, and receives an operation command from the user and outputs the command content to the system control unit 30 as a command signal. The display unit 22 is formed with, for example, a CRT (Cathode Ray Tube) display or liquid crystal display, and displays information such as texts and images. The communication unit 23 is connected to, for example, the network NW to control the communication state with, for example, the information providing server 1. The drive unit 24 reads, for example, data from a disk DK such as a flexible disk, CD (Compact Disc) or DVD (Digital Versatile Disc), and records data in this disk DK. The storage unit 25 is formed with, for example, a hard disk drive, and stores, for example, various programs of a Web browser and the like, and data. The various programs may be acquired through the network from, for example, server devices, or may be recorded in the disk DK and read through the drive unit 24. The input/output interface unit 26 performs interface processing between the operation unit 21 to storage unit 25, and system control unit 30.

The system control unit 30 is formed with, for example, a CPU 27, a ROM 28 and a RAM 29. Further, when the CPU 27 reads and executes various programs stored in the ROM 28 and storage unit 25, the system control unit 30 functions as an information receiving means, a display means, a detecting means, a deciding means, a content request transmitting means, a content receiving means and a switching means.

1-4. Operation of Information Providing System

Next, the operation of the information providing system S will be described using FIG. 6.

FIG. 6 is a sequence diagram illustrating a processing example of the information providing system S according to the present embodiment.

Assume that the user of the user terminal 2 logs in the information providing site before the processing illustrated in FIG. 6. When the user logs in the information providing site, the information providing server 1 issues a session ID for the user terminal 2. A request from the user terminal 2 to the information providing server 1 includes the session ID, so that the information providing server 1 can specify from which user the request is sent.

Further, as illustrated in FIG. 6, the system control unit 30 of the user terminal 2 transmits the request of a Web page including the content display area, to the information providing server 1 (step S1). When receiving the request, the system control unit 17 of the information providing server 1 selects content which is first displayed in the content display area, from the content DB 122 (step S2). At this point of time, the control unit 17 may, for example, select predetermined content or select content at random. Further, the system control unit 17 generates HTML document such that the selected content is displayed in the content display area. In addition, when the content which is first displayed is determined in advance, a Web page which displays this content in the content display area may be stored in advance in the storage unit 12 of the information providing server 1. In this case, the system control unit 17 does not need to generate HTML document.

Next, the system control unit 17 functions as a transmitting means to transmit a Web page which displays the selected content in the content display area, to the user terminal 2 (step S3). More specifically, the system control unit 17 transmits the generated HTML document to the user terminal 2. When the system control unit 30 of the user terminal 2 which has received the HTML document interprets the HTML document, a content request is transmitted from the user terminal 2 to the information providing server 1. Then, the system control unit 17 of the information providing server 1 transmits to the user terminal 2 the content matching the received request, that is, the content selected in step S2.

When the system control unit 30 of the user terminal 2 functions as an information receiving means to receive the Web page, the system control unit 30 functions as a display means to display this Web page in the active display area in the screen (step S4). More specifically, the system control unit 30 expands, for example, a bit map image showing a display image of the Web page, to a predetermined buffer area on the RAM 29. At this point of time, the system control unit 30 also expands the bit map image of the content received from the information providing server 1. Further, the system control unit 30 outputs data of the bit map image in the active display area among the bit map images of the Web page, to the display unit 22. By this means, part of the Web page is displayed in the active display area in the screen. Then, when the user performs a scroll operation of the Web page, the active display area moves with respect to the bit map image of the Web page in response to the scroll operation, and, following this movement, the range of the bit map image data of which is outputted to the display unit 22 as data also moves. That is, the Web page is scroll-displayed.

Further, the system control unit 30 executes a content display control script described in the HTML document per certain time (for example, 100 milliseconds) based on, for example, the setting script of timer activation described in the HTML document.

When executing the content display control script, the system control unit 30 acquires a coordinate of the active display area in the screen (step S5). The coordinate of this active display area indicates the range displayed in the active display area among the display image of the entire Web page. Next, the system control unit 30 acquires the coordinate of the content display area (step S6). The coordinate of this content display area indicates the range of the content display area among the display image of the entire Web page.

Next, the system control unit 30 functions as a detecting means to decide whether or not the user's scroll operation of the Web page is detected (step S7). If, for example, the coordinates at the upper end of the active display area are different when the coordinate is acquired the last time and when the coordinate is acquired this time, it is possible to decide that the scroll operation is detected. Further, the system control unit 30 transitions to step S5 when the user's scroll operation of the Web page is not detected (step S7: NO).

By contrast with this, the system control unit 30 functions as a deciding means to decide whether or not the content display area goes out of the active display area (step S8) when the user's scroll operation of the Web page is detected (step S7: YES). This decision can be made based on the coordinate of the content display area and the coordinate of the active display area. At this time, the system control unit 30 transitions to step S5 when the content display area does not go out of the active display area (step S8: NO).

By contrast with this, the system control unit 30 acquires content which needs to be displayed next in the content display area, from the information providing server 1 when the content display area goes out of the active display area (step S8: YES). More specifically, the system control unit 30 rewrites the received HTML document such that the content displayed in the content display area is changed. Further, as a result of this rewriting, the system control unit 30 functions as a content request transmitting means to transmit a content request (an example of a content request) to the information providing server 1 (step S9).

When the system control unit 17 of the information providing server 1 functions as a content request receiving means to receive the content request, the system control unit 17 selects content from the content DB 122 based on member information of the user of the user terminal 2 which has transmitted the request (step S10). More specifically, the system control unit 17 selects content having a target user attribute which matches the most with content set in member information of the user, among, for example, contents registered in the content DB 122. At this point of time, the system control unit 17 selects content different from the content transmitted in step S2. Further, the system control unit 17 functions as a content transmitting means to transmit the selected content to the user terminal 2 (step S11).

When the system control unit 17 of the user terminal 2 functions as a content receiving means to receive content, the system control unit 17 functions as a switching means to switch content displayed in the content display area to the received content (step S12). More specifically, the system control unit 17 expands the bit map image of the received content to the range of the content display area of the bit map image of the Web page expanded on the buffer area.

Then, when the content display area comes in the active display area, the content received from the information providing server 1 in step S11 is displayed on the screen of the display unit 22.

In addition, when the content displayed in the content display area switches, the content display area comes in the active display area and, then, the content display area goes out of the active display area again, whether or not to switch again the content displayed in the content display area is arbitrary. When the content displayed in the content display area is switched again, in step S10, the system control unit 17 of the information providing server 1 selects, for example, content having the target user attribute which matches in the second most with information set in member information of the user, among contents registered in the content DB 122.

As described above, according to the present embodiment, the system control unit 30 of the user terminal 2 displays a Web page including the content display area, in the active display area in the screen, decides whether or not the content display area in the displayed Web page goes out of the active display area, and switches content displayed in the content display area when the content display area goes out of the active display area. Consequently, the content is switched while the content is not visible for the user, so that it is possible to prevent an eyesore for the user.

Further, the system control unit 30 of the user terminal 2 decides that the content display area in the Web page goes out of the active display area while the Web page is scrolled, so that it is possible to reliably decide that the content display area goes out of the active display area following scroll of the Web page.

Further, the system control unit 30 of the user terminal 2 transmits a content request to the information providing server 1 when the content display area goes out of the active display area, the system control unit 17 of the information providing server 1 selects content different from the content which is a display target in the content display area, among contents registered in the content DB 122 based on member information of the user and transmits the selected content to the user terminal 2, and the system control unit 30 of the user terminal 2 switches the content displayed in the content display area to the received content. Consequently, it is possible to personalize content which is switched and displayed.

In addition, although a content display control script is executed at regular time intervals with the above embodiment, the content display control script may be executed when, for example, a scroll event occurs.

Further, although whether or not the content display area goes out of the active display area is decided while a Web page is scrolled with the above embodiment, a decision timing is by no means limited to this. For example, decision may be made at a timing when scroll of a Web page stops. Further, for example, decision may be made at a timing when a scroll direction changes. This is because content displayed in the active display area becomes invisible once following scroll and then is displayed in the active display area again by, for example, scrolling the Web page in a given direction once by the user to make the content display area go out of the active display area, stopping scrolling the Web page once and next scrolling the Web page in the opposite direction. Hence, it is reasonable to make decision as to whether or not the content display area goes out of the active display area when scroll stops or the scroll direction changes. Further, decision is not made at unnecessary timings, so that it is possible to further reduce a processing load of the system control unit 30 of the user terminal 2. Further, whether or not scroll stops or whether or not the scroll direction changes may be decided based on, for example, a coordinate of the active display area acquired per predetermined time, or may be decided based on content of a scroll event if possible.

Further, in addition to various timings of the above scroll, an intrapage link displayed in the active display area may be decided at a timing selected by the user's operation. The intrapage link refers to a link for a specified position (for example, described as <a href="#xxxx"></a> in HTML document) in the Web page displayed in the active display area. By this means, even when the content display area goes out of the active display area following selection of the intrapage link, it is possible to switch displayed content.

2. Second Embodiment

Next, a second embodiment according the present invention will be described based on the drawings. In addition, hereinafter, differences from the first embodiment will be described, and the same points as in the first embodiment will not be described.

2-1. Overview of Function

First, the overview of the function of the information providing system S according to the present embodiment will be described using FIGS. 7 and 8.

With the above first embodiment, when the content display area goes out of the active display area (when the content display area hides outside the active display area), content displayed in the content display area is switched. By contrast with this, with the second embodiment, the display area according to the present invention is applied to a window in a window system. Further, with the second embodiment, when, on the content display area in a Web page displayed on a window, a window different from this window system overlaps, content displayed in the content display area is switched. That is, when the content display area is hidden by another window, content is switched.

FIGS. 7 and 8 are views illustrating screen display examples of a Web page. In FIGS. 7 and 8, reference numerals 200 and 210 denote windows, respectively. The window 200 is a window of a Web browser. Further, the window 200 displays a Web page including a content display area 201. In the content display area 201, HTML document is described such that the content A is initially displayed. By contrast with this, the window 210 may be a window of a Web browser, or may be a window of an application program other than the Web browser. In addition, the window of the Web browser is referred to as a "browser window".

Figure 7A:
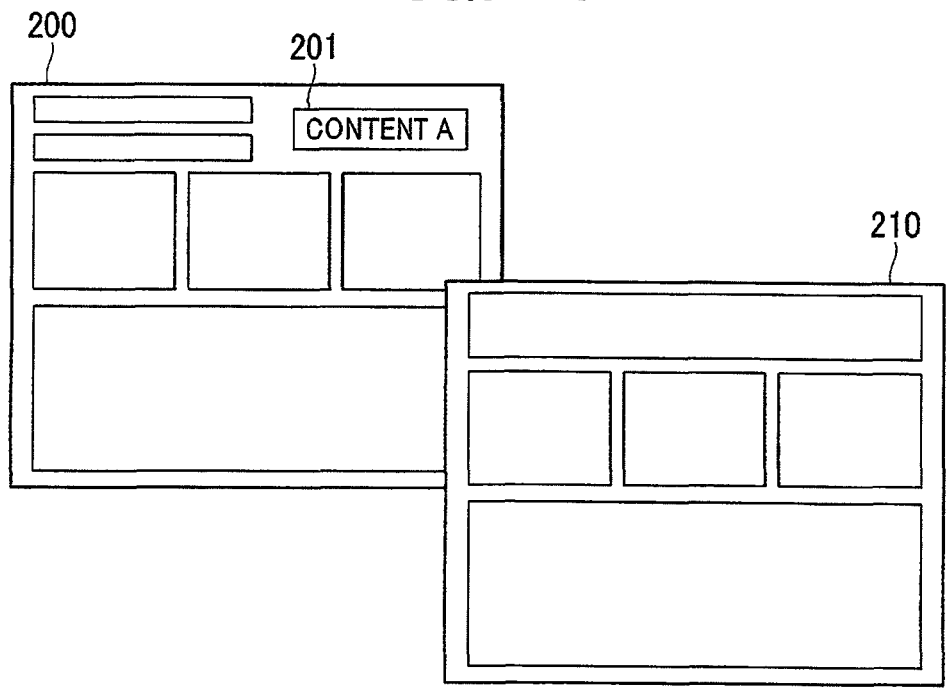
FIGS. 7A and 7B are views illustrating screen display examples of Web pages according to one embodiment.
Figure 7B:
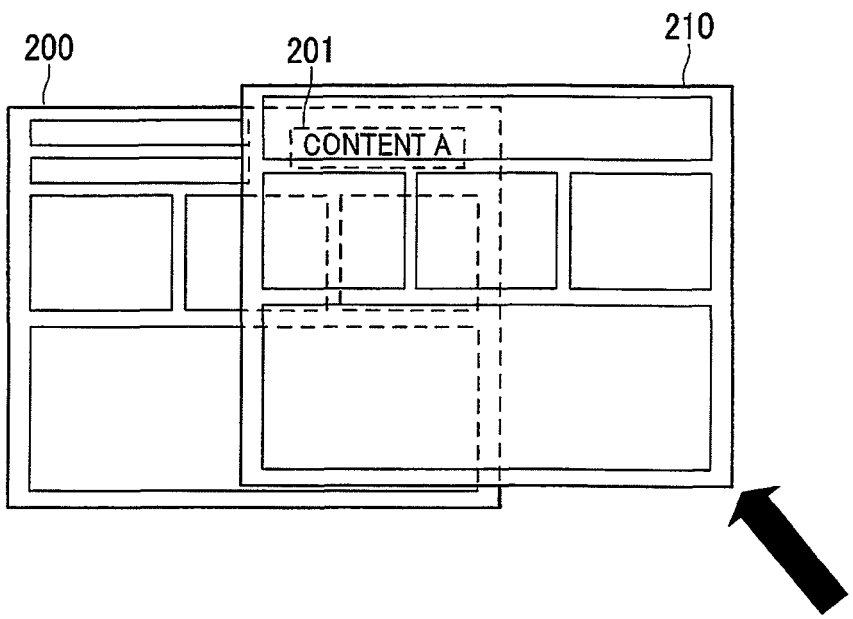
Figure 8A:
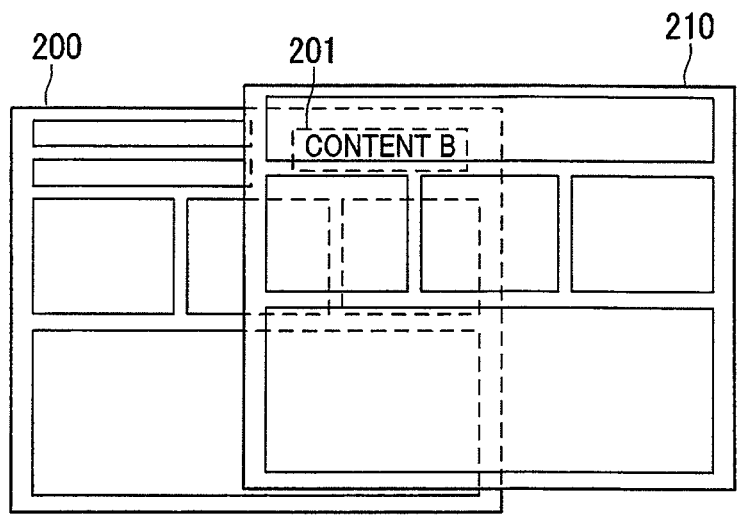
FIGS. 8A and 8B are views illustrating screen display examples of Web pages according to one embodiment.
Figure 8B:
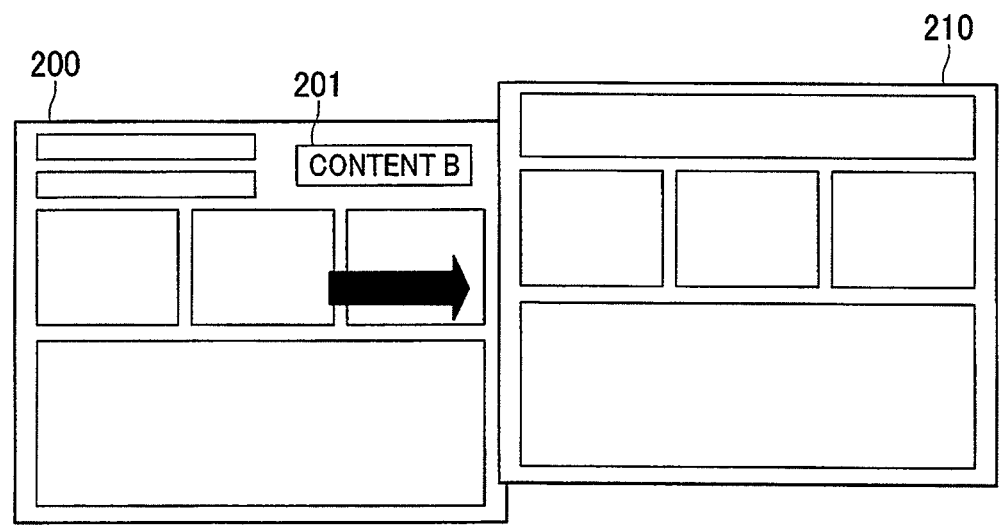

In FIG. 7A, the window 200 is a non-active window, and the window 210 is an active window. The display position of the window 200 and display position of the window 210 partially overlap on the screen. In this overlapping range, the window 210 is displayed on the screen. Meanwhile, the display position of the window 210 does not overlap the content display area 201, and therefore the content A in the content display area 201 is displayed on the screen. Then, the window 210 is moved on the screen by the user's operation of the operation unit 21 of the user terminal 2. As a result, as illustrated in FIG. 7B, the window 210 overlaps the content display area 201 and the content display area 201 hides, and therefore the content A is not seen. Then, as illustrated in FIG. 8A, content displayed in the content display area 201 is switched from the content A to the content B. Subsequently, as illustrated in FIG. 8B, when, for example, the window 210 moves, the window 210 does not overlap the content display area 201. Thus, when the content display area 201 is not hidden, the content B is displayed on the screen.

2-2. Configuration, Function and the Like of User Terminal

The storage unit 25 of the user terminal 2 stores system software for managing windows in a window system. This system software is referred to as a "window manager". In addition, the window system is integrated with, for example, an operating system.

Further, the storage unit 25 stores a Web browser (an example of an information display program) for switching content as described above. Hence, the content display control script does not need to be described in HTML document of a Web page including the content display area. When the Web browser stored in the storage unit 25 is activated, the system control unit 30 of the user terminal 2 acquires information of each window displayed on screen to decide that the window and content display area overlap. The state of each window changes according to an event which occurs in the window. The types of this event include, for example, opening a window (displaying a new window), closing a window (deleting a window), changing an active window, and moving or resizing a window (expanding or reducing a window). The system control unit 30 acquires information of a window every time this specific event occurs. In addition, a specific event related to a window is referred to as a "specific event". The specific event can be recognized by the system control unit 30 which is activating the Web browser in, for example, a mode where the specific event is notified from the window manager to the Web browser. Information delivered from the window manager when the specified event is notified includes, for example, the type of a specific event and a window identifier of a window in which the specific event occurs. The window identifier is unique information assigned by a window manager every time a window is newly opened.

Pieces of information of a window which is an acquisition target is, for example, a window identifier, identification information of an application program to which a window is allocated, position information of a window, position information of the client area and display priority. These pieces of information can be acquired through, for example, an API (Application Program Interface) provided by the window system.

Identification information of the application program is, for example, a file name of an application program or a name of an application program. The position information of a window is, for example, a screen coordinate at the upper left end of the window (the coordinate indicating a position on a screen assuming the upper left end of the screen as the original point) and the number of pixels in the longitudinal and lateral directions of the window. Position information of the client area is, for example, the screen coordinate at the upper left end of the client area and the number of pixels in the longitudinal and lateral directions of the client area.

The display priority is a priority used to determine which window to display on the overlapping range when display positions of a plurality of windows overlap. A window having the highest display priority among a plurality of windows having the overlapping display positions is preferentially displayed in the overlapping range. The window of the first display priority is an active window. The active window is a target to input letters or operate by the user. By contrast with this, windows other than the active window are non-active windows. The display priority of each window is frequently changed by the user's operation.

When the API for acquiring the display priority of each window is not provided, the system control unit 30 decides the display priority of each window according to the notified type of the specific window. More specifically, when a window is opened, the opened window becomes active. Hence, the system control unit 30 sets the first display priority for the opened window and decreases the display priority by one for the other windows displayed on the screen. When the Web browser is activated, one browser window is opened. Hence, the system control unit 30 sets the first display priority for the opened browser window. At this point of time, when a plurality of windows other than the browser window are opened, the Web browser cannot learn an accurate display priority of these windows. In this case, the system control unit 30 adequately allocates the second priority or less for these windows. When a window is closed, the system control unit 30 increases the display priority by one for the windows having a lower display priority than the closed window. When the active window is changed, the system control unit 30 sets the first display priority for an active window, and decreases the display priority by one for windows having a higher display priority than the display priority before this window becomes active. When the window is moved or resized, the moved or resized window becomes active, and therefore the same applies to the active window. In addition, depending on the specification of the window system or specifications of individual application programs, how the display priority changes when the specific event occurs is sometimes different. In this case, the Web browser only needs to be configured such that the display priority is decided according to the respective specifications.

The system control unit 30 generates a window management table for managing information of the window, in the RAM 29. In this window management table, a window identifier, identification information of an application program, position information of a window, position information of the client area and display priority are set per window as window management information. For window management information of windows which display Web pages including the content display areas among windows allocated to the Web browser, position information of the content display area and content display area state are set in addition to the above information. Whether or not the content display area is included in the Web page can be decided by, for example, analyzing HTML document of the Web page. For example, by describing a tag having a name attribute or id attribute which indicates the content display area (for example, a div tag, image tag or p tag), it is possible to decide that the area on the Web page matching this tag is the content display area. The position information of the content display area is the screen coordinate at the upper left end of the content display area and the number of pixels in the longitudinal and lateral directions of the content display area. When the coordinate of the content display area is initially acquired as a client coordinate (the coordinate indicating the position on the client area assuming the upper left end of the client area as the original point), the acquired client coordinate is converted into a screen coordinate. The content display area state indicates whether or not the content display area is hidden by windows. When the content display area is not hidden, a "visible state" is set to the content display area state, and, when the content display area is hidden, the "invisible state" is set to the content display area. In addition, for ease of description, the content display area does not go out of the client area of the window when the Web page is scrolled.

2-3. Operation of Information Providing System

Next, the operation of the information providing system S will be described using FIG. 9.

When the Web browser is activated by the user's operation, the system control unit 30 of the user terminal 2 opens one browser window. Further, the system control unit 30 acquires information of each window, and generates a window management table. At this point of time, the system control unit 30 sets the first display priority for the browser window.

Then, based on the user's operation, the system control unit 30 opens a new window or closes, moves or resizes existing windows. Further, when the user specifies the URL of a Web page, the system control unit 30 transmits a request of the Web page to a Web server such as the information providing server 1 and displays the Web page received from the Web server on a window which is the target of the Web browser. At this point of time, when the displayed Web page includes the content display area, the system control unit 30 sets the content display area state to the "visible state".

Figure 9:
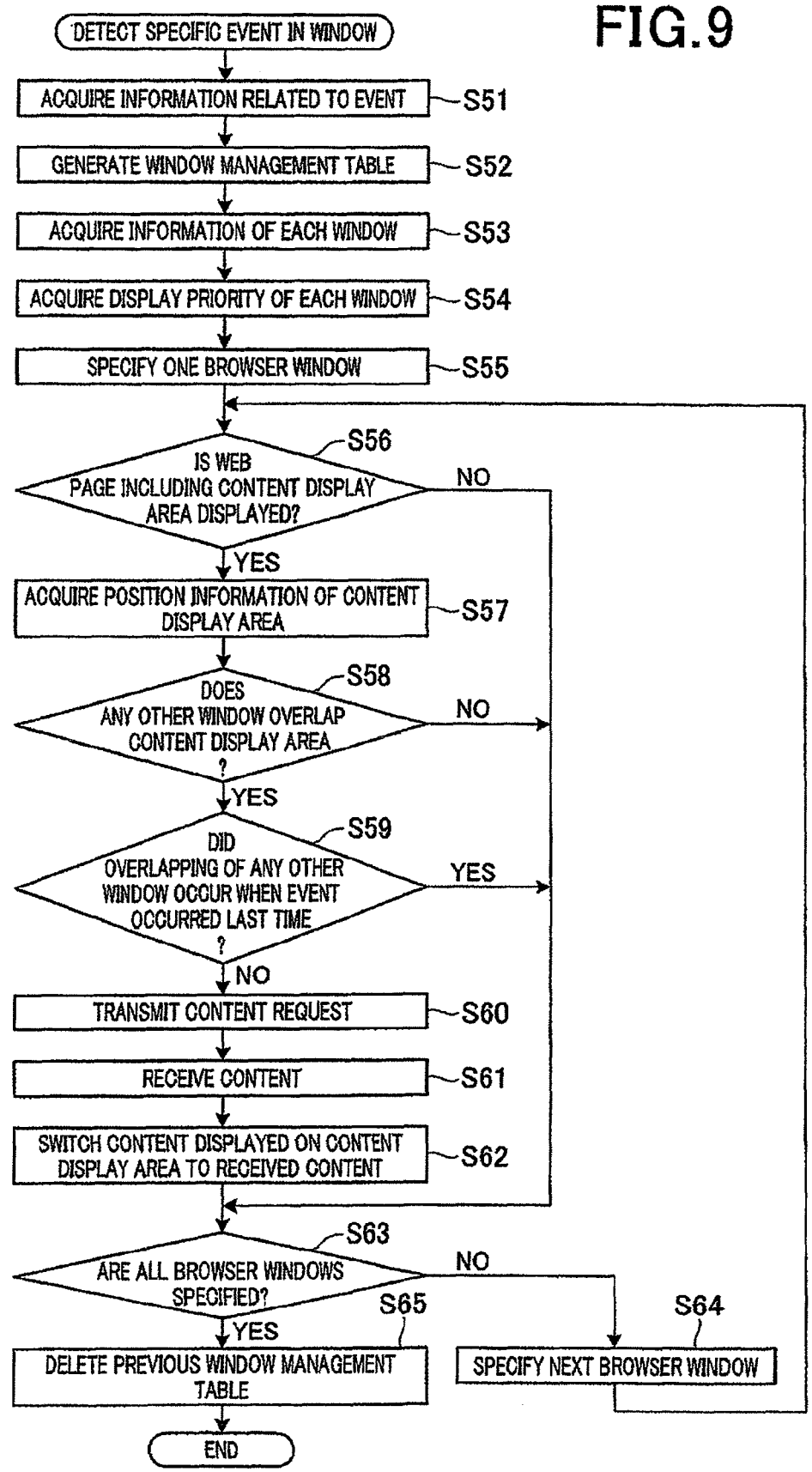
FIG. 9 is a flowchart illustrating a processing example in a system control unit 30 of the user terminal 2 according to one embodiment.
Figure 10A:
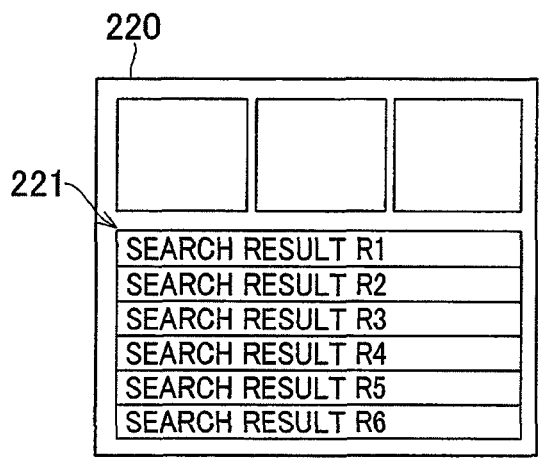
FIGS. 10A to 10D are views illustrating screen display examples of Web pages according to one modified example.
Figure 10B:
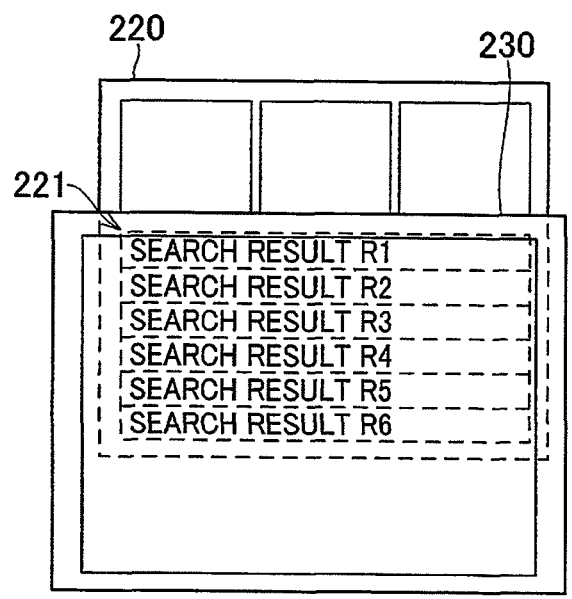
Figure 10C:
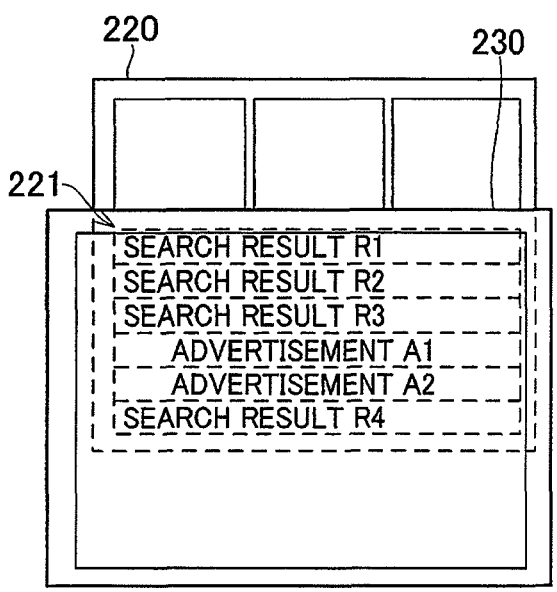
Figure 10D:
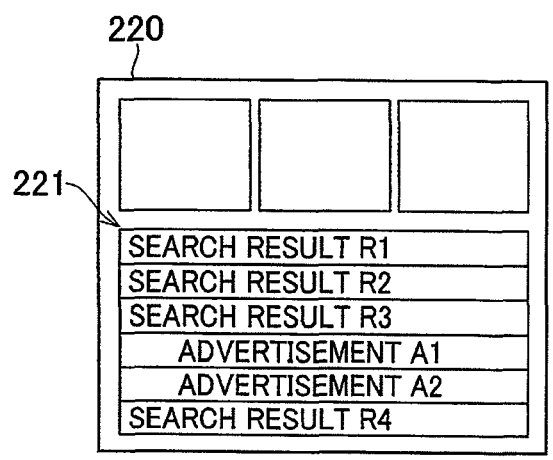
Figure 11A:
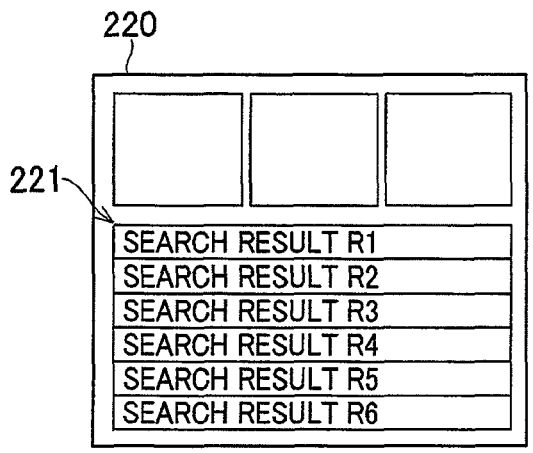
FIGS. 11A to 11D are views illustrating screen display examples of Web pages according to one modified example.
Figure 11B:
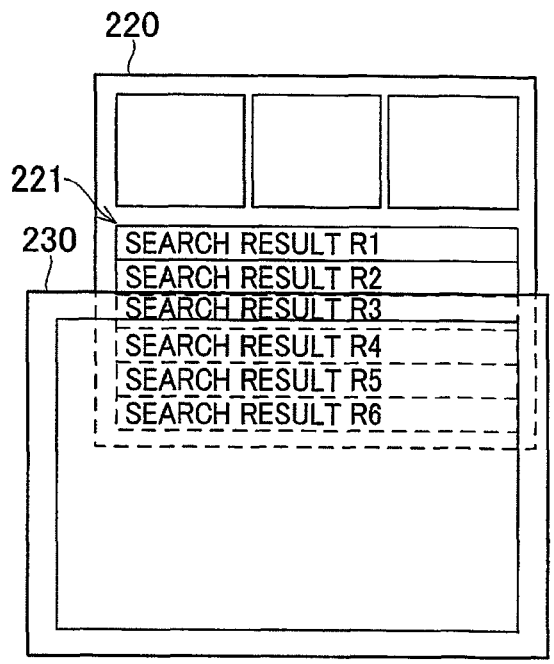
Figure 11C:
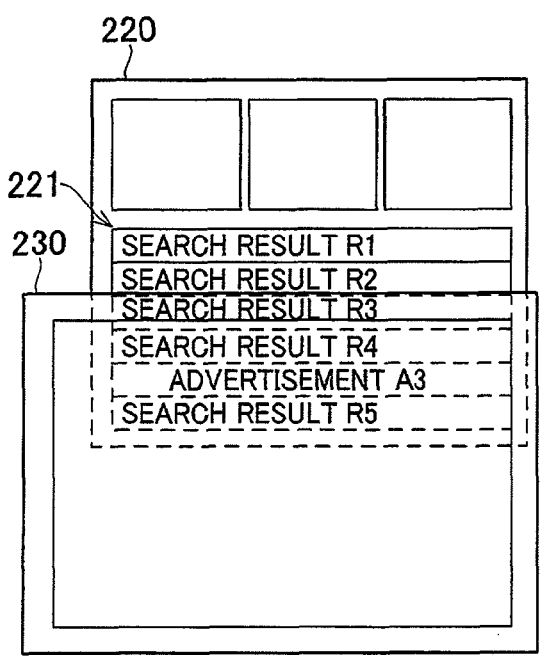
Figure 11D:
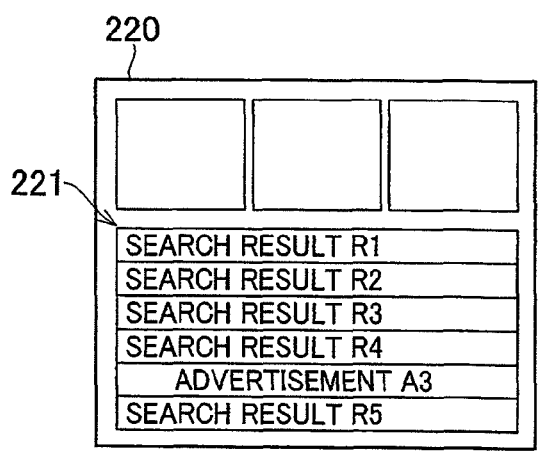

FIG. 9 is a flowchart illustrating a processing example in the system control unit 30 of the user terminal 2 according to the present embodiment. The processing illustrated in FIG. 9 is executed every time the specific event is notified to the Web browser in a state where the Web browser is activated.

First, when the specific event is notified, the system control unit 30 acquires the type of the specific event and a window identifier of a window in which the specific event has occurred (step S51). Next, the system control unit 30 generates a new window management table (step S52). This new window management table is referred to as a "new window management table", and the window management table generated when a previous specific event is notified is referred to as an "old window management table". In addition, when a notice of the current specific event is the first notice after the Web browser is activated, the window management table generated upon activation of the Web browser is the old window management table.

Next, the system control unit 30 acquires the window identifier of each window, identification information of an application program, position information of the window and position information of the client area, and sets these pieces of information to the new window management table (step S53).

Next, the system control unit 30 acquires the display priority of each window (step S54). More specifically, the system control unit 30 decides the display priority of each window at the current point of time based on the type of the specific event and window identifier acquired in step S51, window identifier of each window set in the new window management table, window identifier of each window set in the old window management table and display priority. Next, the system control unit 30 sets the display priority of each window to the new window management table.

Next, the system control unit 30 specifies one browser window based on identification information of the application program set in the new window management table (step S55). Next, the system control unit 30 decides whether or not a Web page including the content display area is displayed in the specified browser window (step S56). At this point of time, the system control unit 30 transitions to step S63 when the Web page including the content display area is not displayed in the specified browser window (step S56: NO).

By contrast with this, the system control unit 30 acquires position information of the content display area (step S57) when the Web page including the content display area is displayed in the specified window (step S56: YES). Further, the system control unit 30 sets position information of the acquired content display area in the new window management table.

Next, the system control unit 30 decides whether or not windows overlap the content display area (step S58). More specifically, the system control unit 30 acquires the display priority of the specified browser window from the new window management table. Next, the system control unit 30 extracts a window having a higher display priority than the display priority of the specified browser window, based on the display priority of each window set in the new window management table. Next, the system control unit 30 decides whether or not the content display area is included in the area of the extracted window on the screen, based on position information of the extracted window and position information of the content display area. At this point of time, the system control unit 30 decides that windows do not overlap the content display area (step S58: NO) when the content display area is not included in the area of the extracted window. In this case, the system control unit 30 sets the "visible state" to the new window management table as the content display area state of the specified browser window, and transitions to step S63.

By contrast with this, the system control unit 30 decides that windows overlap the content display area when the content display area is included in the area of the extracted window (step S58: YES). In this case, the system control unit 30 sets an "invisible state" to the new window management table as the content display area state of the specified browser window. Next, the system control unit 30 decides whether or not windows overlap the content display area when a previous specific event was notified (step S59). More specifically, the system control unit 30 acquires the content display area state of the specified browser window from the old window management table. Further, the system control unit 30 decides that windows overlap the content display area when the acquired content display area state is in the "invisible state" (step S59: YES). In this case, the system control unit 30 transitions to step S63.

By contrast with this, the system control unit 30 decides that windows do not overlap the content display area when the acquired content display area state is in the "visible state" (step S59: NO). In this case, the system control unit 30 transmits a content request to the information providing server 1 (step S60). Subsequently, the system control unit 30 receives content transmitted from the information providing server 1 (step S61). Next, the system control unit 30 switches content displayed in the content display area to the received content (step S62), and transitions to step S63. In addition, processing content of the user terminal 2 and processing content of the information providing server 1 in steps S60 to S62 are the same as in the first embodiment.

In step S63, the system control unit 30 decides whether or not all browser windows are specified. At this point of time, the system control unit 30 specifies the next browser window (step S64) when there are browser windows which are not specified (step S63: NO), and transitions to step S56. Further, the system control unit 30 executes processings in steps S56 to S62 for the specified window.

By contrast with this, the system control unit 30 deletes the old window management table from the RAM 29 (step S65) when all windows of the Web browser are specified (step S63: YES), and finishes processing illustrated in FIG. 9.

As described above, according to the present embodiment, the system control unit 30 of the user terminal 2 displays in a window a Web page including the content display area, decides whether or not windows other than the window which displays the Web page including the content display area overlap the content display area, and switches content displayed in the content display area when windows other than the window which displays the Web page including the content display area overlap the content display area. Consequently, the content is switched while the content is not visible for the user, so that it is possible to prevent an eyesore for the user.

In addition, although the Web browser switches content when windows overlap the content display area with the above second embodiment, for example, the window manager may switch content.

2-4. Modified Example

Next, a modified example according to the present embodiment will be described using FIGS. 10 and 11.

2-4-1. Modified Example 1

Although the embodiments have been described above where one content is displayed in the content display area, a plurality of contents may be displayed in the content display area. Further, when windows overlap the content display area, one or more contents of the contents included in the content display area may be switched.

FIG. 10 is a view illustrating a screen display example of a Web page according to the modified example 1. In FIG. 10, reference numerals 220 and 230 denote windows, respectively. The window 220 is a browser window. Further, in the window 220, the Web page including a content display area 221 displays a Web page. In FIG. 10A, in the content display area 221, six search results of search results R1 to R6 are displayed sequentially from above as examples of contents. These search results are, for example, search results of a search engine, or search results of a product in a shopping site. Then, as illustrated in FIG. 10B, a window 230 overlaps the content display area 221 according to the user's operation, the content display area 221 hides, and the search results R1 to R6 becomes invisible. Further, as illustrated in, for example, FIG. 10C, the search results R5 and R6 in the content display area 221 are switched to advertisement contents A1 and A2, respectively. In addition, with the example illustrated in FIG. 10C, the advertisement contents A1 and A2 are inserted between the search result R3 and search result R4. Then, as illustrated in FIG. 10D, when the content display area 221 is not hidden, the search results R1 to R4 and advertisement contents A1 and A2 are displayed on the screen.

The system control unit 30 of the user terminal 2 selects content which is a switching target, from contents in the content display area when windows overlap the content display area. At this point of time, a number of contents to be switched or which contents to switch are arbitrary. For example, search results are displayed in order from the highest priority of the search result. In this case, the system control unit 30 may sequentially select a search result positioned in a lower portion of the content display area as a switching target. The system control unit 30 transmits a number of content requests corresponding to the number of contents which are switching targets, to the information providing server 1. Every time the content request is received, the information providing server 1 transmits content from the content DB 122 to the user terminal 2. In this case, the information providing server 1 selects content to transmit to prevent a plurality of the same content from being displayed in the content display area. The system control unit 30 of the user terminal 2 receives content from the information providing server 1, and switches content. At this point of time, the system control unit 30 may change an arrangement of each content in the content display area before the content is switched.

Thus, with the present modified example, when a plurality of contents are arranged in the content display area, it is possible to switch arbitrary content of these contents.

2-4-2. Modified Example 2

Although content is switched when the content display area completely hides with the modified example 1, content may be switched when windows partially overlap the content display area and the content display area partially hides.

FIG. 11 is a view illustrating a screen display example of a Web page according to the modified example 2. Similar to FIG. 10A, in FIG. 11A, the search results R1 to R6 are displayed in the content display area 221. Subsequently, as illustrated in FIG. 11B, a window 230 overlaps the content display area 221, and only the search results R3 to R6 of the search results R1 to R6 become invisible. Then, as illustrated in, for example, FIG. 11C, the search result R6 in the content display area 221 is switched to advertisement content A3. In addition, with the example illustrated in FIG. 11C, the advertisement content A3 is inserted between the search result R4 and search result R5. Subsequently, as illustrated in FIG. 11D, when the content display area 221 is not hidden, the search results R1 to R5 and advertisement content A3 are displayed on the screen.

The system control unit 30 of the user terminal 2 acquires position information of each content in the content display area when a window partially overlaps the content display area. Next, the system control unit 30 decides which content is hidden among contents in the content display area, based on the acquired position information. Further, the system control unit 30 selects content of a switching target from contents which are decided to be hidden among the contents in the content display area.

Thus, with the present modified example, even when the content display area is hidden only partially, it is possible to switch content without causing an eyesore for the user.

3. Other

With the above modified example 1 or modified example 2, the first embodiment may be applicable. That is, a plurality of contents may be displayed in the content display area. Further, when the content display area goes out of the active display area, one or more contents may be switched among contents included in the content display area. Instead, when part of the content display area goes out of the active display area and the part of the content display area hides, content may be switched.

Further, the first embodiment and second embodiment may be combined. That is, when at least one of conditions that the content display area goes out of the display area or the display area overlaps the content display area are met, content to be displayed in the content display area may be switched.

Further, although content which is switched and displayed in the content display area is selected based on member information of the user with each of the above embodiments, the criterion of selection is by no means limited to this. By, for example, storing a user's purchase history (an example of history information) of a product or service on an information providing site or predetermined Web site, in the storage unit 12 of the information providing server, content may be selected based on this purchase history. In this case, content such as an advertisement of a product of the same genre as products the user purchased or a relevant genre is selected. By this means, it is possible to personalize content which is switched and displayed. Further, by storing, for example, a user's browsing history of Web pages or use history (an example of history information), in the storage unit 12 of the information providing server, content may be selected based on, for example, this browsing history or use history. Also in this case, it is possible to personalize content which is switched and displayed. Further, content may be selected according to a predetermined priority or at random.

Further, although, when content displayed in the content display area is switched, content which is switched and displayed is transmitted from the information providing server 1 to the user terminal 2 with each of the above embodiment, content may be selected by the user terminal 2 when content displayed in the content display area is switched by also transmitting a plurality of contents to the user terminal 2 when the information providing server 1 transmits a Web page. When, for example, content is text data, by describing a plurality of items of text data which can be selection targets, in the content display control script, the user terminal 2 can easily select and switch text data.

Further, although one server device transmits Web pages and content with each of the above embodiments, separate server devices may perform respective processings.

Further, with each of the above embodiments, information including the content display area according to the present invention is applied to Web pages. However, information including the content display area according to the present invention is applicable as long as information can be displayed in a display area in the screen or information allows an arrangement of the content display area therein. This information is, for example, electronic document.

REFERENCE SIGNS LIST

1 INFORMATION PROVIDING SERVER
2 USER TERMINAL
11 COMMUNICATION UNIT
12 STORAGE UNIT
13 INPUT/OUTPUT INTERFACE UNIT
14 CPU
15 ROM
16 RAM
17 SYSTEM CONTROL UNIT
18 SYSTEM BUS
121 MEMBER INFORMATION DB
122 CONTENT DB
21 OPERATION UNIT
22 DISPLAY UNIT
23 COMMUNICATION UNIT
24 DRIVE UNIT
25 STORAGE UNIT
26 INPUT/OUTPUT INTERFACE UNIT
27 CPU
28 ROM
29 RAM
30 SYSTEM CONTROL UNIT
31 SYSTEM BUS
NW NETWORK
S INFORMATION PROVIDING SYSTEM

The invention claimed is:

1. An information display device including at least one processor comprising:
 a display that displays information including a content display area that displays at least one content, in a display area in a screen;
 a deciding unit within said processor that decides the content which is completely overlapped among the contents included in the content display area in the information displayed in the display area; and
 a switch within said processor that switches at least one content among the contents which is completely, overlapped to another content, when and only when the content is completely overlapped.

2. The information display device according to claim 1, wherein the display displays the information including the content display area that displays a plurality of contents in the display area, the deciding unit within said processor decides whether the content display area is completely overlapped and the switch within said processor, when and only when it is decided that the content display area is completely overlapped, switches at least one content among the plurality of contents to another content, when and only when the content display area is completely overlapped.

3. The information display device according to claim 2, wherein the deciding unit within said processor decides whether or not display areas other than the display area that displays the information among a plurality of display areas arranged in the screen overlap the content display area, and the switch within said processor, when and only when it is decided that the display areas other than the display area that displays the information overlap the content display area, switches at least one content among the contents which is completely overlapped in the display area which overlap the content display area, to another content.

4. The information display device according to claim 1, wherein the display displays the information including the content display area that displays a plurality of contents in the display area, the deciding unit within said processor decides whether or not the content display area is partially overlapped, and the switch within said processor, when and only when it is decided that the content display area is partially overlapped, switches at least one content among the contents which is entirely included within the partially overlapped content display area, to another content.

5. The information display device according to claim 4, wherein the deciding unit within said processor decides whether or not display areas other than the display area that displays the information among a plurality of display areas arranged in the screen overlap the content display area, and the switch within said processor, when and only when it is decided that the display areas other than the display area that displays the information overlap the content display area, switches at least one content among the contents which is completely overlapped in the display area which overlap the content display area, to another content.

6. The information display device according to claim 1, wherein the deciding unit within said processor decides whether or not display areas other than the display area that displays the information among a plurality of display areas arranged in the screen overlap the content display area, and the switch within said processor, when and only when it is decided that the display areas other than the display area that displays the information overlap the content display area, switches at least one content among the contents which is completely overlapped in the display area which overlap the content display area, to another content.

7. An information display device including at least one processor comprising:

a display that displays information including a content display area that displays content, in a display area in a screen;

a deciding unit within said processor that decides whether or not the content display area goes out of the display area, and a switch within said processor that, when and only when it is decided that the content display area goes out of the display area, switches content displayed in the content display area.

8. The information display device according to claim 7, wherein the display displays the information including the content display area that displays a plurality of contents, in the display area; and the switch within said processor, when and only when it is decided that the content display area goes out of the display area, switches at least one content among the plurality of contents, to another content.

9. The information display device according to claim 8, wherein the deciding unit within said processor decides whether or not the content display area partially goes out of the display area, and the switch within said processor, when and only when it is decided that the content display area partially goes out of the display area, switches at least one content among the contents positioned in a going-out portion, to another content.

10. The information display device according to claim 8, further comprising a detector within said processor that detects scroll of the information displayed in the display area, wherein, in the deciding unit within said processor, the decision is made when the information is scrolled.

11. The information display device according to claim 8, further comprising a detector within said processor that detects stop of scroll of the information displayed in the display area, wherein, in the deciding unit within said processor, the decision is made when the stop of the scroll of the information is detected.

12. The information display device according to claim 8, further comprising a detector within said processor that detects a change of a scroll direction of the information displayed in the display area, wherein, in the deciding unit within said processor, the decision is made when the change of the scroll direction of the information is detected.

13. The information display device according to claim 8, wherein the display displays a Web page including the content display area, in the display area, as the information, the information display device further comprises a link selection detector within said processor that detects selection of a link to a Web page included in the Web page displayed in the display area, and in the deciding unit within said processor, the decision is made when the selection of the link is detected.

14. The information display device according to claim 7, further comprising a detector within said processor that detects scroll of the information displayed in the display area, wherein, in the deciding unit within said processor, the decision is made when the information is scrolled.

15. The information display device according to claim 7, further comprising a detector within said processor that detects stop of scroll of the information displayed in the display area, wherein, in the deciding unit within said processor, the decision is made when the stop of the scroll of the information is detected.

16. The information display device according to claim 7, further comprising a detector within said processor that detects a change of a scroll direction of the information displayed in the display area, wherein, in the deciding unit within said processor, the decision is made when the change of the scroll direction of the information is detected.

17. The information display device according to claim 7, wherein the display displays a Web page including the content display area, in the display area, as the information, the information display device further comprises a link selection detector within said processor that detects selection of a link to a Web page included in the Web page displayed in the display area, and in the deciding unit within said processor, the decision is made when the selection of the link is detected.

18. An information display method in an information display device that displays information including a content display area that displays at least one content, in a display area in a screen, comprising;

a deciding step of deciding the content which is completely overlapped among the contents included in the content display area in the information displayed in the display area; and a switching step of switching at least one content among the contents which is completely overlapped, to another content, when and only when the content is completely overlapped.

19. An information display method in an information display device that displays information including a content display area that displays content, in a display area in a screen, comprising;

a deciding step of deciding whether or not the content display area goes out of the display area, and a switching step of, when and only when it is decided that the content display area goes out of the display area, switching content displayed in the content display area.

20. An information display system comprising:

an information display device that displays information including a content display area that displays at least one content; and a server device that can be connected with the information display device through a network, wherein the server device comprises:

a content storage unit that stores a plurality of contents displayed in the content display area;

an information transmitting unit that transmits the information to the information display device;

a content request receiving unit that receives a content request transmitted from the information display device;

a selecting unit that, when the content request is received, selects one of contents except content that is a display target in the content display area, among the contents stored in the content storage unit; and a content transmitting unit that transmits the selected content to the information display device, and wherein the information display device comprises:

an information receiving unit that receives the information transmitted from the server device;

a display unit that displays the received information in a display area in a screen;

a deciding unit that decides the content which is completely overlapped among the contents included in the content display area in the information displayed in the display area;

a content request transmitting unit that transmits the content request to the server device for at least one content among the contents which is completely overlapped;

a content receiving unit that receives content transmitted from the server device; and a switching unit that switches the at least one content, to the received content, when and only when the content is completely overlapped.

21. An information display system comprising:

an information display device that displays information including a content display area that displays content; and a server device that can be connected with the information display device through a network, wherein the server device comprises:

a content storage unit that stores a plurality of contents displayed in the content display area;

an information transmitting unit that transmits the information to the information display device;

a content request receiving unit that receives a content request transmitted from the information display device;

a selecting unit that, when the content request is received, selects one of contents except content that is a display target in the content display area, among the contents stored in the content storage unit; and a content transmitting unit that transmits the selected content to the information display device, and wherein the information display device comprises:

an information receiving unit that receives the information transmitted from the server device;

a display unit that displays the received information in a display area in a screen;

a deciding unit that decides whether or not the content display area goes out of the display area;

a content request transmitting unit that, when and only when it is decided that the content display area goes out of the display area, transmits the content request to the server device;

a content receiving unit that receives content transmitted from the server device; and a switching unit that switches the content displayed in the content display area, to the received content.

* * * * *